United States Patent
Yokoro

(10) Patent No.: US 8,205,199 B2
(45) Date of Patent: Jun. 19, 2012

(54) METHOD AND SYSTEM FOR ASSOCIATING NEW QUEUES WITH DEPLOYED PROGRAMS IN DISTRIBUTED PROCESSING SYSTEMS

(75) Inventor: Atsuhiro Yokoro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1828 days.

(21) Appl. No.: 10/941,834

(22) Filed: Sep. 16, 2004

(65) Prior Publication Data

US 2005/0160135 A1 Jul. 21, 2005

(30) Foreign Application Priority Data

Jan. 15, 2004 (JP) .................. 2004-007625

(51) Int. Cl.
*G06F 9/46* (2006.01)
(52) U.S. Cl. ...................................................... 718/101
(58) Field of Classification Search .................. 718/104, 718/106; 719/312; 714/2
See application file for complete search history.

(56) References Cited

U.S. PATENT DOCUMENTS

| | | | | |
|---|---|---|---|---|
| 6,081,906 A | * | 6/2000 | Nishizawa et al. | 714/2 |
| 7,051,330 B1 | * | 5/2006 | Kaler et al. | 718/106 |
| 7,152,231 B1 | * | 12/2006 | Galluscio et al. | 719/312 |
| 7,401,334 B2 | * | 7/2008 | Fussell | 718/104 |
| 7,702,739 B1 | * | 4/2010 | Cheng et al. | 709/207 |

OTHER PUBLICATIONS

"JAVA2 Platform Enterprise Edition Specification, V1.2", created by Sun Microsystems, Inc., 1999.

* cited by examiner

*Primary Examiner* — Meng An
*Assistant Examiner* — Eric C Wai
(74) *Attorney, Agent, or Firm* — Brundidge & Stanger, P.C.

(57) ABSTRACT

A queue is configured for accumulating a request to process a program component in an application server even when a naming service is used so as to enable priority control, flow control, or load distribution for component processing. A scheduler is provided between client terminals and a container server. The physical position information of the queue is associated with the logical name of the component, for registration in the naming service. The naming service is referenced for name resolution of the logical name of the component on which the processing request has been made from a client terminal, and stores the processing request on the component in the queue corresponding to the obtained physical position information of the queue. By using the queue, the scheduler can perform priority control, flow control, load distribution control, or the like for processing of the component.

9 Claims, 7 Drawing Sheets

FIG. 3

QUEUE MANAGEMENT TABLE

| LOGICAL NAME OF COMPONENT | PHYSICAL POSITION INFORMATION OF COMPONENT | INTERFACE INFORMATION | QUEUE ENTITY INFORMATION |
|---|---|---|---|
| /XXX/aaa | RA | AAA | XXX(HqX) |
| /YYY/bbb | RB | BBB | YYY(HqYb) |
| /YYY/ccc | RC | CCC | YYY(HqYc) |
| /ZZZ/aaa | RZ | AAA | ZZZ(HqZ) |
| ... | ... | ... | ... |

METHOD AND SYSTEM FOR ASSOCIATING NEW QUEUES WITH DEPLOYED PROGRAMS IN DISTRIBUTED PROCESSING SYSTEMS

INCORPORATION BY REFERENCE

The present application claims priority from Japanese application JP2004-007625 filed on Jan. 15, 2004, the content of which is hereby incorporated by reference into this application.

BACKGROUND OF THE INVENTION

The present invention relates to an application server that executes processing of a program component in response to a request transmitted from a certain computer to other computer in a distributed computer environment. More specifically, the invention relates to a method of configuring a queue for the request to process the program component, a method of registering the program component and a method of controlling execution of the program component, a program for registering the program component and a program for controlling execution of the program component, and the application server.

With expansion of computer networks in recent years, client-server systems have been adopted in many service businesses that use computer resources. In the client-server system, usually, a server executes a computer application business requested by a client, and provides the result of the execution to the client.

The server of this type is referred to as the application server. On this application server, a lot of program components for the computer application service requested by the client, which will be hereinafter referred to just as components, are deployed. Then, part of the application server on which the program components are deployed and which performs management such as deployment registration and deletion of the components and controls execution of the components is especially referred to as a container server.

Computer application service businesses in the client-server system keep on becoming more and more compound and complicated. For this reason, the client only identifies each component by its logical name that would be valid just within the range of his business, and cannot uniquely identify the components deployed on the container server. For this reason, when processing of a component is requested from a client terminal to the container server, a naming service as shown in the "Java™ 2 Platform Enterprise Edition Specification, v1.2" created by Sun Microsystems, Inc., 1999 is employed.

The naming service is also referred to a name resolution service, and generally refers to the service which provides physical position information such as network addresses from names assigned to computer resources including files, in the computer network. In the client-server system, the logical names of the components uniquely defined for respective client businesses are associated with the physical position information of the components deployed on the container server, for registration, for example. Then, when the client inputs into the naming service the logical name of a component uniquely defined for his business, the naming service outputs the physical position information of the component having the input logical name uniquely defined for his business. Then, the client can request the container server to execute the component, using the physical position information of the component.

The naming service and a component model as described above have become widespread in the client-server system described in the "Java™ 2 Platform Enterprise Edition Specification".

SUMMARY OF THE INVENTION

In the client-server system based on the component model and the naming service, however, the following inconvenience is sometimes caused. When client terminals are many and unspecified personal computers connected to the Internet, processing requests are concentrated on a small number of specific components. Then, due to contention of the processing of the components on which the processing requests are concentrated, the performance of the entire system sometimes decreases. In order to avoid such a situation, a queue for accumulating requests to process components is usually provided, and a countermeasure such as priority control, flow control, or load distribution for component processing is thereby taken. With this arrangement, the performance of the entire system can be prevented from decreasing.

When the above-described naming service is used, however, the physical position information of the components is associated with the logical names of the components in the naming service. For this reason, by directly specifying the physical position information of a component, a request to process the component is made from a client terminal. Thus, it is difficult to provide a queue between the client terminals and the container server. Accordingly, the countermeasure such as the priority control, flow control, or load distribution for component processing, which could have been executed by providing the queue, could not be substantially taken.

The present invention, therefore, provides a method of configuring a queue for a request to process a component, required for effecting priority control, flow control, or load distribution for component processing, a method of registering the component, and a method of controlling execution of the component, even when the naming service is used in the client-server system based on Sun's Java 2 Platform, Enterprise Edition (J2EE) or the like. In addition, the present invention provides a program for registering the component and a program for controlling execution of the component, and an application server that have embodied these methods.

The basic concept for solving the above-mentioned problem is to change the contents registered in the naming service from those in the conventional art so as to enable provision of the queue. More specifically, in the conventional naming service, the physical position information of a component is associated with the logical name of the component, for registration. On the other hand, in the present invention, the physical position information of a queue is associated with the logical name of the component corresponding to the queue, for registration.

In an application server of the present invention, a queue for accumulating a request to process each component is provided between the client terminals and a container server, corresponding to each component. Then, the physical position information of the queue is associated with the logical name of each component, for registration in the naming service. Further, a queue management table for associating the physical position information of each component with the physical position information of the queue is provided. It is arranged that the queue management table can associate one queue with the physical position information of a plurality of mutually different components as well as the physical position information of one component. Further, a scheduler for managing the queue configured as described above, extracting the processing request on the component accumulated in the queue, and commanding execution of the component to the container server is provided.

By configuring the application server as described above, each client terminal can make the request to process a component using its logical name. Then, the processing request on the component is accumulated in the queue indicated by its physical position information obtained by the naming service. Since the queue is associated with the physical position information of the component by the queue management table, the scheduler for managing the queue can command execution of the component to the container server.

Further, since the scheduler manages queues, the scheduler can monitor the statuses of processing requests in each of the queues. Accordingly, the scheduler can perform priority control, flow control, or load distribution for component processing.

In the present invention, or the application server of the present invention, when a component has been deployed in the container, the scheduler deploys a queue for accumulating a request to process the component, corresponding to the queue. In addition, the scheduler registers correspondence between the physical position information of the component with the physical position information of the queue in the queue management table. Then, the naming service associates the physical position information of the queue with the logical name of the component corresponding to the queue.

Alternatively, the scheduler refers to the registration status of components in the naming service when processing of registering correspondence between the logical name of a component and the physical position information of the component in the naming service has been started, or at fixed time intervals. The scheduler thereby obtains the logical name of a component newly registered in the container server and the physical position information of the newly registered component. The scheduler deploys a queue for accumulating a request to process the newly registered component, corresponding to the newly registered component. In addition, the scheduler registers correspondence between the physical position information of the newly registered component and the physical position information of the queue in the queue management table. Then, the naming service associates the physical position of the queue with the logical name of the component corresponding to the queue.

A procedure for executing a component in the application server configured as described above is as follows: First, a client terminal inquires of the naming service the logical name of a component to be executed, and obtains the physical position information of the queue corresponding to the logical name of the component. Then, the client terminal issues a request to process the component to the queue indicated by the physical position information of the queue. When the client terminal issues the processing request on the component, the scheduler temporarily accumulates the processing request in the specified queue. Then, the scheduler extracts the processing request on the component from the queue, refers to the queue management table, and then obtains the physical position information of the component. Next, the scheduler requests execution of the component indicated by the physical position information of the component to the container server. Then, the container server executes the component on which the processing request has been made, and sends data resulting from the execution to the client terminal through the scheduler.

From the standpoint of a client, the procedure for executing a component is as follows: If the client requests processing of the component based on the physical position information of the component obtained by inputting the logical name of the component into the naming service, he can obtain the execution result of the processing. It means that this procedure remains unchanged from the procedure in the conventional client-server system in the J2EE environment. In other words, the client never needs to pay attention to the presence of the queue and the scheduler.

As described above, according to the present invention, the naming service associates the logical name of a component with the physical position of the queue corresponding to the component, rather than the physical position information of the component. Thus, the queue for accumulating a processing request on the component can be provided between the client terminals and the container server.

Other objects, features and advantages of the invention will become apparent from the following description of the embodiments of the invention taken in conjunction with the accompanying drawings.

BRIEF DESCRIPTION OF THE DRAWINGS

FIG. 3 shows a configuration of a queue management table according to the embodiment of the present invention;

DESCRIPTION OF THE EMBODIMENTS

An embodiment of the present invention will be described below in detail with reference to the appended drawings as necessary.

<Embodiment of a Configuration of an Application Server and a Queue Thereof>

Figure 1:
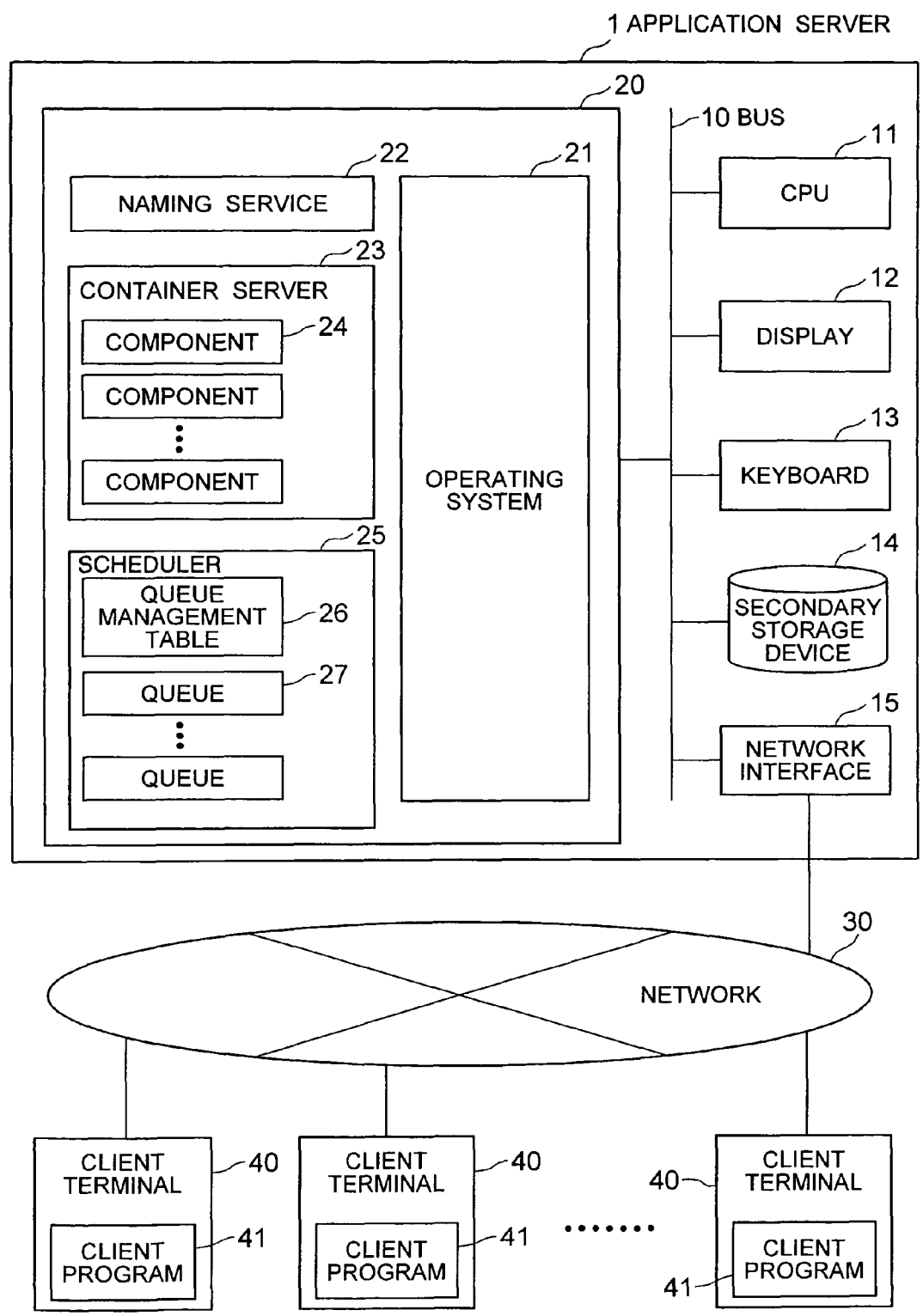
FIG. 1 is a block diagram showing a configuration of an application server according to the present invention and an overall configuration of a client-server system to which the application server is applied.

FIG. 1 is a block diagram showing a configuration of an application server according to the present invention and an overall configuration of a client-server system to which the application server is applied. Referring to FIG. 1, the client-server system according to the present invention is constituted from an application server 1, a network 30 for the Internet or the like, and a plurality of client terminals 40. Though the application server of the present invention is used in the client-server system in this embodiment, it can be used in a distributed computer environment in general, and can also be used in a distributed object environment.

The application server 1 is a computer in which a main storage device 20, a display 12, a keyboard 13, a secondary storage device 14, and a network interface 15 and the like are connected to a CPU (Central Processing Unit) 11 through a bus 10. The main storage device 20 includes a naming service 22, a container server 23, and a scheduler 25 as application programs in this embodiment, in addition to an operating system 21.

The container server 23 includes a plurality of components 24 that are so programmed as to execute predetermined processing, and controls execution of a component 24 in response to a request from a client terminal 40. The scheduler 25 includes queues 27 for the respective components 24. Each of the queues 27 functions to accumulate the request to process its corresponding component 24. The scheduler 25 stores the request to process a component 24 from a client terminal 40 in its corresponding queue 27. The scheduler 25 further includes a queue management table 26. The queue management table 26 registers correspondence between the physical position information of the components 24 and the physical position information of the queues 27, and also searches for the physical position information of a component 24 corresponding to the physical position information of a certain queue 27.

The naming service 22 is a program that associates the physical position information of the queues 27 with the logical names of the components 24. Accordingly, once a client has registered the correspondence in the naming service 22 and if he inputs the logical name of a component 24, he can obtain the physical position information of a queue 27 corresponding to the component 24.

Though the naming service is used in conventional arts such as "Java™ 2 Platform Enterprise Edition Specification v1.2" mentioned above, the physical position information of the components 24 is associated with the logical names of the components 24 in the conventional arts. Thus, the correspondence used in the conventional arts is different from the correspondence used in this embodiment.

The client terminals 40 are connected to the application server 1 through the network 30. Each of the client terminals 40 usually includes a client program 41 associated with a specific computer application business. Then, while executing the client program 41, each of the client terminals 41 requests execution of a specific component 24 deployed on the container server 23 to the application server 1, in response to a request from the client. The client terminal 40 also functions as a display device for informing the result of the execution of the component 24 to the client.

Referring to FIG. 1, the container server 23 is assumed to be the program included in the same computer as the application server 1. The container server may also be the program included in other computer. When the other computer operates as the container server 23 alone, the container server 23 may also be regarded as the computer. Further, referring to FIG. 1, though the component 24 is assumed to be the program constituting part of the container server 23, the component 24 may be the program included in the other computer, or may be regarded as the computer itself. Further, referring to FIG. 1, though the client terminals 40 are connected to the application server 1 through the network 30, the client terminals 40 may be directly connected to the application server 1, or may be the programs configured inside the application server 1. Accordingly, the application server 1, container server 23, components 24, and client terminals 40 are configured in a plurality of completely distributed computers. On the contrary, the application server 1 including the container server 23 and the components 24 may be the program constituting part of a computer for general purpose use.

Figure 2:
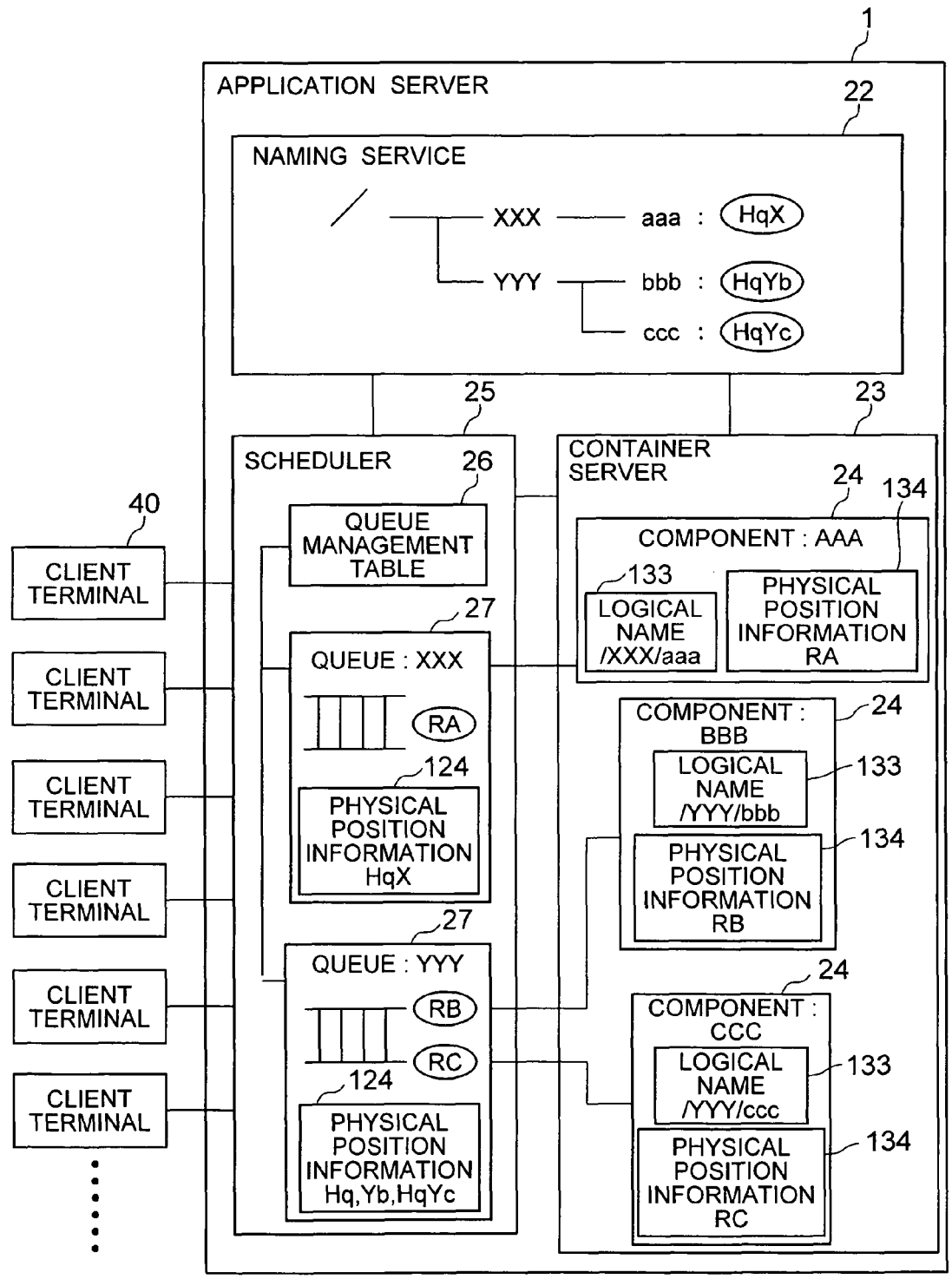
FIG. 2 is a block diagram for explaining the configuration of the application server in an embodiment of the present invention in further detail.

FIG. 2 is a block diagram for explaining the configuration of the application server 1 in the embodiment of the present invention in further detail.

Referring to FIG. 2, in the naming service 22, the logical name of a component such as /XXX/aaa is associated with physical position information 124 of a queue corresponding to the component, such as HqX. The logical names of components such as /YYY/bbb and /YYY/ccc are associated with the physical position information 124 of queues corresponding to the components, such as HqYb and HqYc, respectively.

The logical name of a component is constituted from a plurality of hierarchies. Thus, by using its hierarchical structure, the components can be grouped according to the names of application businesses or the like.

The plurality of components 24 are deployed in the container server 23. Each component 24 has a logical name 133 and is deployed in the physical position indicated by physical position information 134 such as RA. In the scheduler 25, the queues 27 are so deployed as to correspond to the components 24. Each queue 27 is deployed in a physical position indicated by physical position information 124 such as HqX. Incidentally, one queue 27 such as a queue YYY may be associated with a plurality of components 24 such as a component BBB and a component YYY, as shown in FIG. 2.

The scheduler 25 further includes the queue management table 26, by which the queues 27 are associated with the components 24. FIG. 3 shows a configuration of the queue management table 26 in the embodiment of the present invention. The queue management table 26 is the table in which the logical name 133 of a component 24 of /XXX/aaa is associated with the physical position information 134 (indicated by RA, for example) of the component 24 and the physical position information 124 of its corresponding queue 27 (indicated by HqX, for example).

Referring to the queue management table 26 in FIG. 3, the physical position information 124 of a queue 27 such as HqX is divided into different portions constituted from the portion indicating the physical entity of the queue 27 (queue entity information 341 such as XXX) and the portion indicating the component 24 (interface information 331 such as AAA), for registration. Referring to the queue management table 26 in FIG. 3, the physical position information 124 of the queue 27 (such as HqX) is shown in parentheses in the column of the queue entity information 341, for reference.

In the queue management table 26, the physical position information 134 of the different components 24 (such as RB and RC) is associated with the queues 27 having the same queue entity information 341 (such as YYY). In such a case, requests to process the components BBB and CCC deployed in the physical positions RB and RC, respectively, in the container server 23 are received with the same queue 27 shared therebetween. In this case, the client terminal 40 sends the interface information 331 (such as BBB) to the queue 27 corresponding to the component 24. Thus, by referring to the queue management table 26, the scheduler 25 can select the component 24 that includes the physical position information 134 (such as RB) corresponding to the interface information.

<First Embodiment of a Procedure for Registering a Component>

Figure 4:
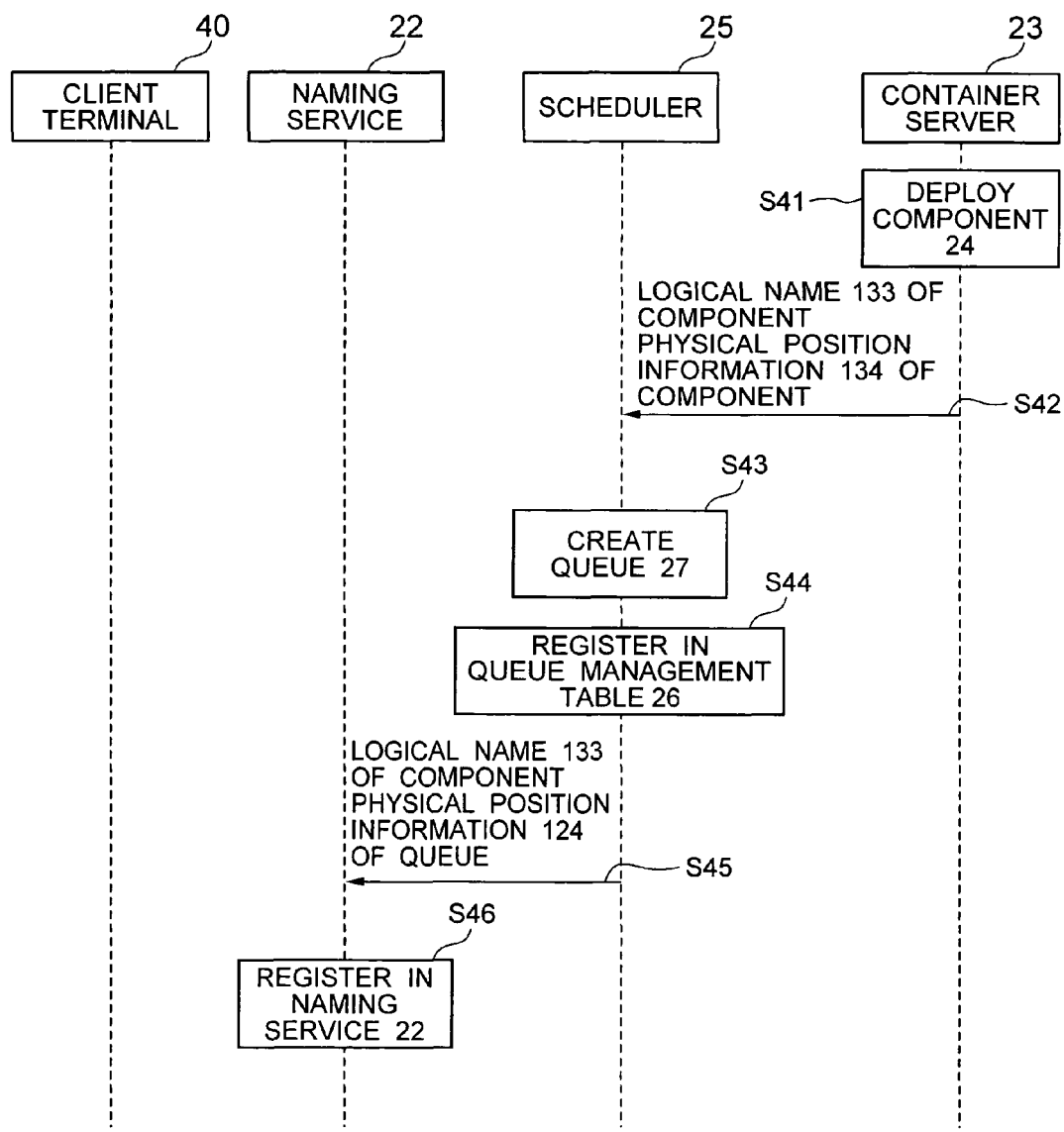
FIG. 4 is a flow chart showing a first embodiment of a procedure for registering a component in the application server in the embodiment of the present invention.

FIG. 4 is a flowchart showing a first embodiment of a procedure for registering a component 24 in the application server 1 in the embodiment of the present invention. The procedure will be described with reference to FIGS. 2 and 3 as necessary.

After deploying a component 24 (such as AAA) first, the container server 23 informs the scheduler 25 of the logical name 133 (such as /XXX/aaa) of the component 24 and the physical position information 134 (such as RA) of the component at step 42.

Upon receipt of this notification, the scheduler 25 creates a queue 27 (such as XXX) corresponding to the component 24 and deploys it at step S43. Then, the scheduler 25 obtains the queue entity information 341 (such as XXX) and the interface information 331 (such as AAA) of the queue 27, associates them with the physical position information 134 (such as RA) of the component and registers them in the queue management table 26 in step S44. If the same queue 27 is shared and the queue 27 is already deployed, creation of the queue 27 is omitted.

Next, the scheduler 25 creates the physical position information 124 (such as HqX) of the queue 27 according to the queue entity information 341 and the interface information 331 of the queue 27. Then, the scheduler 25 associates the physical position information 124 of the queue 27 with the logical name 133 of the component 24, such as /XXX/aaa, and inputs them into the naming service 22 at step S45, and registers them in the naming service 22 at step S46.

By executing the above procedure, the component 24 and its corresponding queue 27 are deployed. Then, the physical position information 134 of the component 24 is associated with the physical position information 124 of the queue 27 in the queue management table 26. The physical position information 124 of the queue 27 is also associated with the logical name 133 of the component in the naming service 22. With this arrangement, the client terminal 40 can access the component 24 deployed on the container server 23 by the logical name 133 of the component 24.

Further, just by changing the logical name of the component 24 to be registered in the naming service 22 from /XXX/aaa to /ZZZ/aaa, for example, by the scheduler 25 using above procedure, assignment of the queue 27 corresponding to the component 24 can be changed from XXX (HqX) to ZZZ (HqZ). With this arrangement, the configuration of the queue can be flexibly and dynamically changed; for example, the configuration of the queue 27 can be changed even while the application server 1 is operating on line.

<Second Embodiment of a Procedure for Registering a Component>

Figure 5:
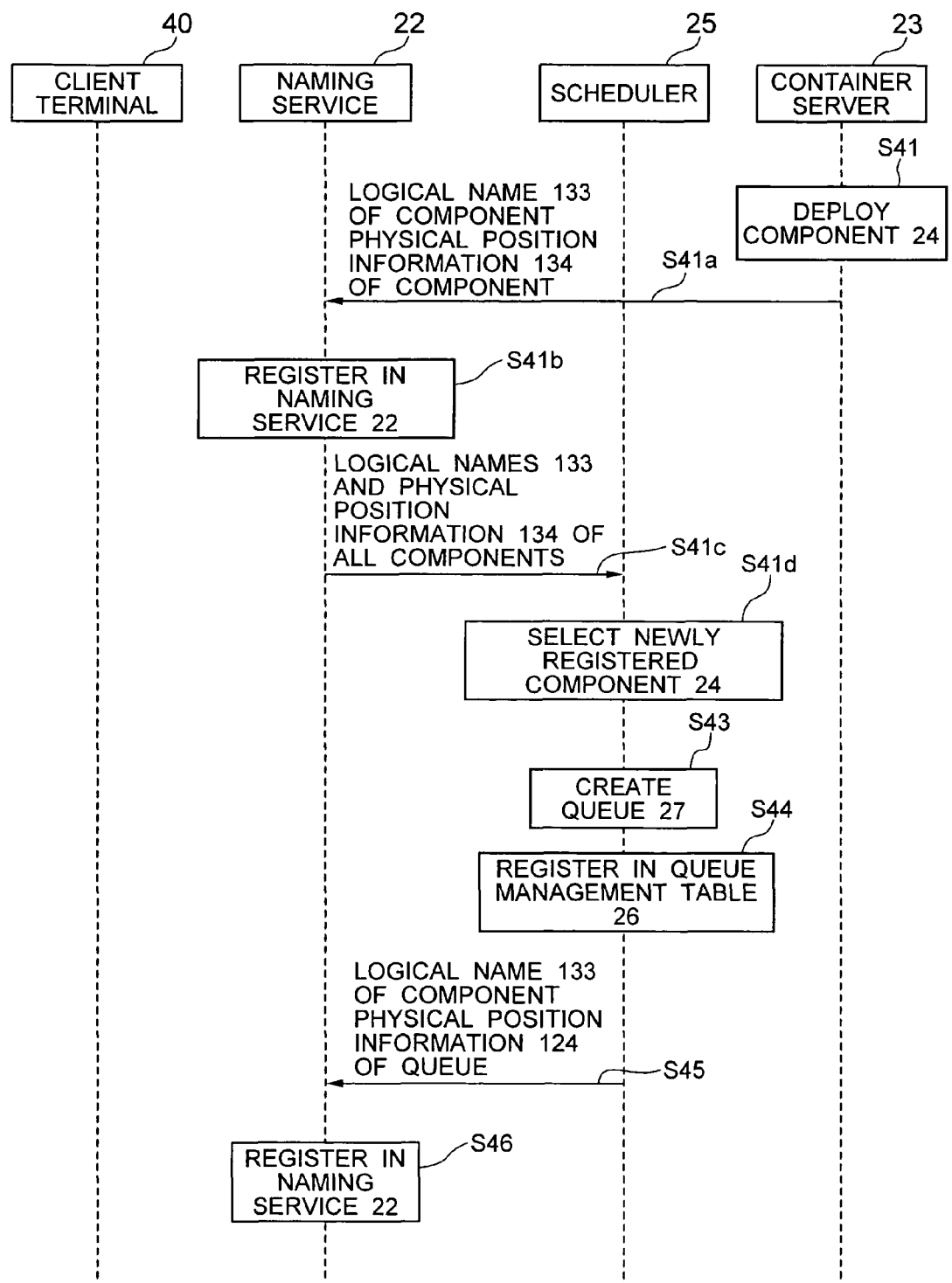
FIG. 5 is a flow chart showing a second embodiment of a procedure for registering a component in the application server in the embodiment of the present invention.

FIG. 5 is a flow chart showing a second embodiment of a procedure for registering a component 24 in the application server 1 according to the embodiment of the present invention. The procedure will be described with reference to FIGS. 2 and 3 as necessary.

Referring to FIG. 5, after deploying the component 24 at step S41, the container server 23 informs the naming service 22 of the logical name 133 (such as /XXX/aaa) of the component 24 and the physical position information 134 (such as Ra) of the component 24 at step 41a. Then, the naming service 22 associates the physical position information 134 (such as Ra) of the component with the logical name 133 (such as /XXX/aaa) of the component, for registration, at step S41b.

These are the steps commonly executed by the container server 23 of the conventional application server.

Next, the scheduler 25 obtains from the naming service 22 the logical names 133 and the physical position information 134 of all the components 24 currently registered in the naming service 22 when the scheduler 25 starts the above-mentioned processing or at fixed time intervals (of three hours, 12 hours, or one day, for example) at step 41c. By comparing the logical names 133 of the components currently obtained with the logical names 133 of the components obtained likewise last, the scheduler 25 selects a newly registered component 24 at step S41d.

When the above steps have been executed, the scheduler 25 obtains the logical name 133 and the physical position information 134 of the newly registered component, which is the same state as that after step S42 in the first embodiment in FIG. 4 has been executed. Accordingly, the steps from step S43 to step S46 become quite the same as those in the first embodiment. Thus, their descriptions will be omitted. In step S46, however, the physical position information 134 of the queue 27 is registered in the logical name 133 of the component in which the physical position information 134 of the component 24 has already been registered in the step S41b, in the form of overwriting.

If a plurality of components 24 have been newly registered at step 41d, the processing from step S43 to step S46 is repetitively executed on all the newly registered components 24. Then, when the processing has been completed, the logical names 133 of the components are associated with the physical position information 124 of the queues 27, for registration, in the naming service 22.

As described above, the second embodiment of the procedure for registering the components 24 is the procedure for registering the components 24 that is executed so as to enable practice of the present invention after the procedure of registering the components 24 used in a conventional application server in a J2EE environment has been executed. Accordingly, by adopting the registration procedure in this embodiment, the need for changing the program of the conventional application server is eliminated, except for addition of the scheduler 25 provided with the queues according to the present invention. More specifically, it becomes easier to carry out the present invention in the conventional application server in the J2EE environment.

<Embodiment of a Procedure for Controlling Execution of a Component>

Figure 6:
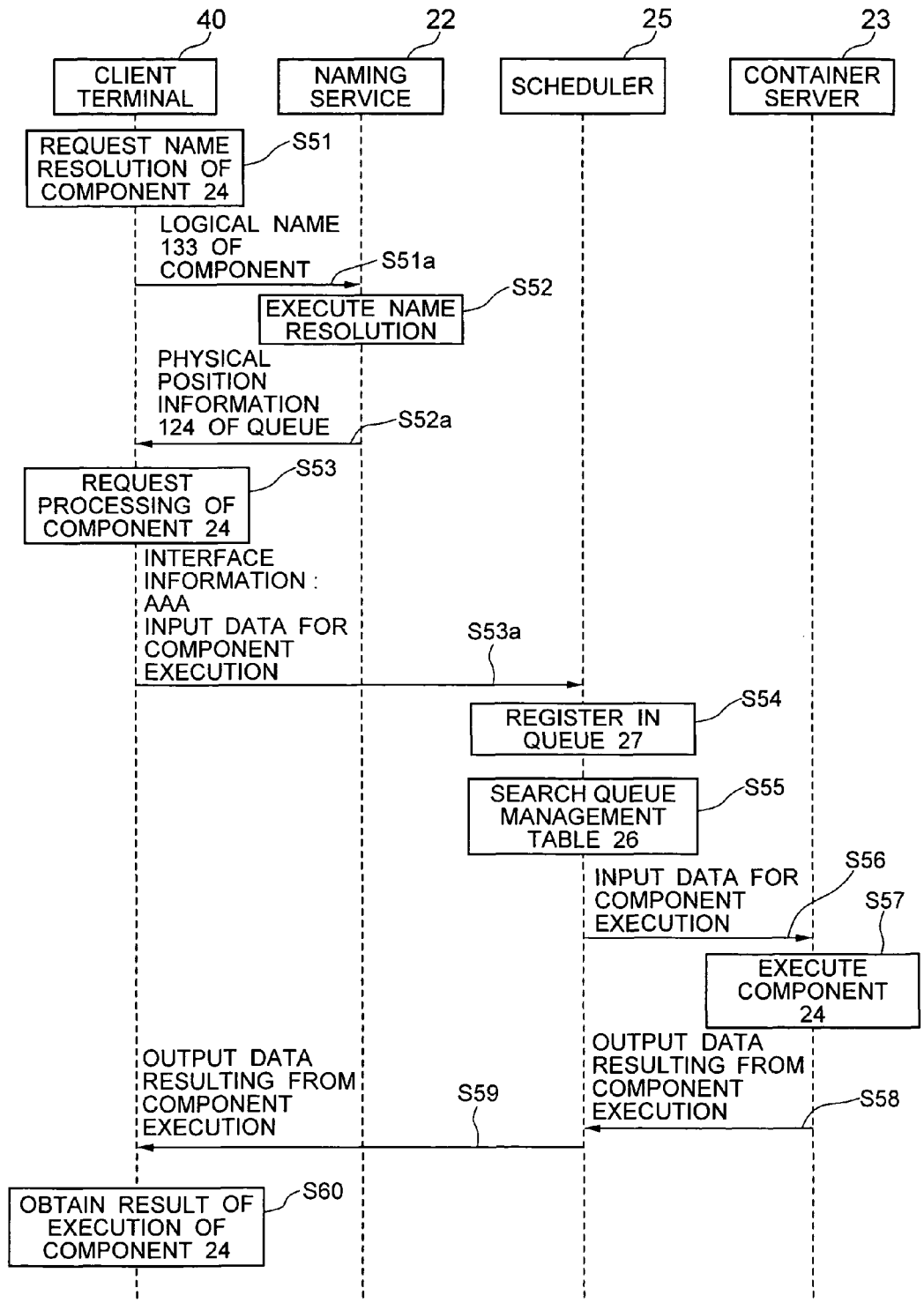
FIG. 6 is a flow chart showing an embodiment of a procedure for controlling execution of a component in the application server in the embodiment of the present invention.

FIG. 6 is a flow chart showing an embodiment of a procedure for controlling execution of a component 24 in the application server 1 in the embodiment of the present invention. The procedure will be described with reference to FIGS. 2 and 3 as necessary.

When a client terminal 40 requests processing of executing a component 24 to the application server 1, the client terminal 40 first requests name resolution of the component 24 to the naming service 22 at step S51. At this point, the client terminal 40 inputs the logical name 133 (such as /XXX/aaa) of the component 24 into the naming service 22 at step S51. Then, the naming service 22 does the name resolution of the input logical name 133 at step 52, and returns the physical position information 124 (such as HqX) of the queue 27 corresponding to the component to the client terminal 40 at step S52a.

Next, the client terminal 40 requests processing of executing the component 24 at step S53. In this case, the client terminal 40 transmits to the queue 27 (such as XXX) indicated by the physical position information 124 (such as HqX) of the queue 27 obtained by the name resolution the interface information 331 (such as AAA) of the component 24 and input data needed for execution of the component 24, included in the physical position information 124 of the queue 27, at step S53a.

Then, the interface information 331 (such as AAA) of the component 24 and the input data to the component 24 are temporarily registered in the queue 27 (such as XXX) specified by the client terminal 40, as a request for execution of the component 24 at step S54. Next, when the request for processing the component 24 is taken from the queue 27 of a first-in, first-out structure, the scheduler 25 searches the queue management table 26 based on the queue entity information 341 (such as XXX) of the queue and the interface information 331 (such as AAA), thereby obtaining the physical position information 134 (such as RA) of the component at step S55.

Next, the scheduler 25 inputs the input data for execution of the component 24 into the component 24 (such as AAA) having the physical position information 134 (such as RA) of the component obtained as described above, at step S56. The component 24 obtains the input data and performs predetermined processing at step S57, and outputs the result of the execution to the scheduler 25 at step S58. The scheduler 25 then sends it to the client terminal 40 at step S59. As described above, the client terminal 40 obtains the result of execution of the component 24 sent from the scheduler 25 at step S60.

By executing the above procedure, the application server 1 can instruct execution of the component 24 requested from the client terminal 40 through the queue 27 even when the naming service 22 is used. Then, the scheduler 25 can perform priority control, flow control, and distribution control for execution of the request for processing the component 24 accumulated in the queue 27.

<Embodiment of a Configuration of an Application Server in a Distributed Component System>

Figure 7:
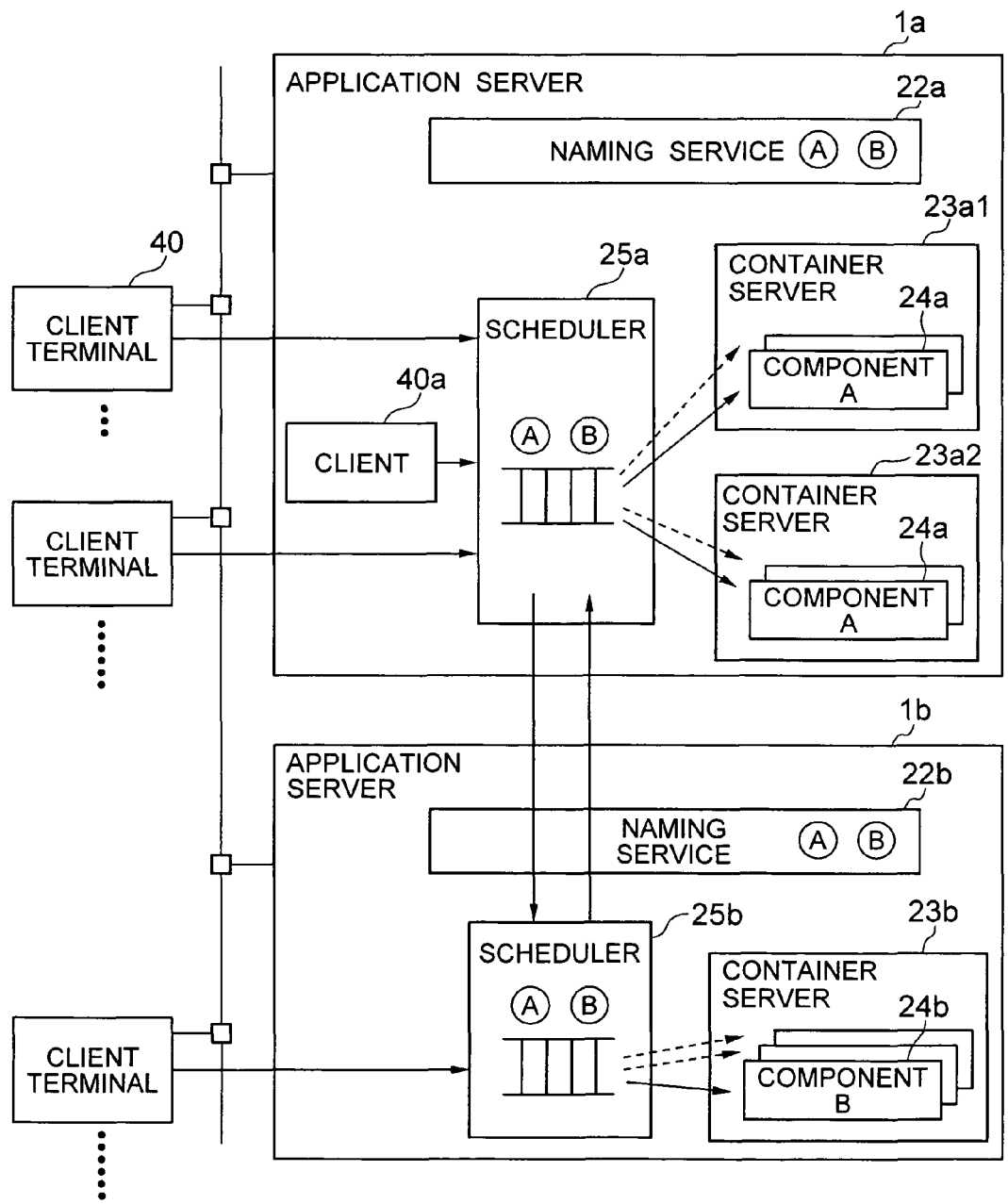
FIG. 7 is a block diagram showing a configuration of the application server of the present invention, applied to a distributed component system.

FIG. 7 is a block diagram showing an embodiment of a configuration of an application server in a distributed component system.

Referring to FIG. 7, an application server 1a is constituted from a naming service 22a, and a scheduler 25a for controlling components 24a deployed in a plurality of container servers 23a1 and 23a2. An application server 1b is constituted from a naming service 22b, and a scheduler 25b for controlling components 24b deployed in a container server 23b. Incidentally, the client may be present in the application server 1a, like a client 40a.

Referring to FIG. 7, a plurality of container servers (such as 23a1 and 23a2) are provided for the application server 1a, and the same component 24a is deployed for each of the container servers. When the plurality of container servers is operated as in this case, there is the effect of distributing the load of a processing request on the component 24a. Further, as long as other container server (such as 23a2) operates, the container server does not lose the function as the container server even when one of the container servers (such as 23a1) has ended in abnormal termination. For this reason, availability of the application server 1a is improved.

Referring to FIG. 7, it is arranged that the component 24b and the component 24a are different to each other. Then, it is arranged that information on the registered components 24a and 24b are exchanged between the scheduler 25a and the scheduler 25b. Thus, even if the information on the components is present in the different application servers, it is arranged that they are registered in the naming services 22a and 22b. More specifically, in each of the naming service 22a in the application server 1a and the naming service 22b in the application server 1b, information on the components 24a and 24b deployed in the container servers 23a1 (or 23a2) and 23b are registered.

With this arrangement, even when a component (such as 24b) on which a processing request has been made from a client terminal 40 is not present in its container server 23a1, the application server (such as 1a) sends the processing request to other application server (such as 1b), thereby allowing execution of the processing request on the component (such as 24b) by the application server (such as 1b).

Accordingly, in such a configuration, even if one application server (such as 1a) ends in abnormal termination, other application server (such as 1b) can operate. Thus, the maximum performance or the functions of the client-server system can be degenerated for operation. Accordingly, the availability as the client-server system is improved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method of configuring a queue for a request to process a program component in an application server, the application server comprising:
    a container server unit, including a plurality of program components in a memory of the application server, for executing the program components on a CPU;
    a scheduler unit including queues for storing processing requests from client terminals in the memory of the application server, wherein the processing requests are to be executed by one of the program components on the CPU; and
    a naming service unit for receiving a request for physical location information of one of the program components from one of the client terminals; and
    the method comprising:
    when deploying one of the program components by the container server unit, the scheduler unit creating a new queue in the scheduler unit for the deployed program component and registering physical position information of the created new queue and a logical name of the deployed program component to correspond to each other in a queue management table; and
    when receiving a request for the location information of the deployed program component by the naming service unit, the naming service unit obtaining the physical position information of the created new queue using the logical name of the deployed program component and sending the obtained physical position information of the created new queue to the client terminal in response to the received request, and
    the scheduling unit receiving a processing request and storing the processing request into the created new queue according to the location information indicated by the processing request.

2. A method of registering a program component in an application server, the application server comprising:
    a container server unit, including a plurality of program components, for executing the program components;
    a scheduler unit including queues for storing processing requests from client terminals, wherein the processing requests are to be executed by one of the program components; and
    a naming service unit for receiving a request for physical location information of one of the program components from one of the client terminals;
    the method comprising:
    the container server unit deploying one of the program components;
    the scheduler unit creating a new queue in the scheduler unit for the deployed program component;
    the scheduler unit registering correspondence between physical position information of the new queue for storing the deployed program component and physical position information of the deployed queue in a queue management table;
    when receiving a request for the physical location information of the deployed program component by the naming service unit, the naming service unit obtaining the physical position information of the new queue with a logical name of the deployed program component and sending the obtained physical position information of the created new queue to one of the client terminals in response to the received request; and the scheduler unit storing one of the processing requests received from said one of the client terminals into the created new queue.

3. A method of controlling execution of a program component in an application server, the application server comprising:

a container server unit, including a plurality of program components, for executing the program components;

a scheduler unit including queues for storing processing requests from client terminals, wherein the processing requests are to be executed by one of the program components; and a naming service unit for receiving requests for physical location information of one of the program components from one of the client terminals;

the method comprising:

when receiving a request for the physical location information of a deployed program component by the naming service unit, the naming service unit obtaining the physical position information of a created new queue using the logical name of the deployed program component;

the naming service unit outputting, to one of the client terminals, the physical position information of the newly created queue in the scheduler unit corresponding to the logical name of the deployed program component in response to the received request;

the scheduler unit storing one of the processing requests received from said one of the client terminals into the newly created queue;

the scheduler unit extracting said one of the processing requests for the program component stored in the newly created queue, referring to a queue management table to obtain physical position information of the program component, and requesting execution of the program component indicated by the physical position information of the program component to the container server unit;

the container server unit executing the program component; and the container server unit sending data resulting from the execution of the program component to one of the client terminals through the scheduler unit.

4. A non-transitory computer-readable medium which stores a program component registration program for registering a program component in an application server, the application server comprising:

a container server unit, including a plurality of program components, for executing the program components;

a scheduler unit including queues for storing processing requests from client terminals, wherein the processing requests are to be executed by the program components; and a naming service unit for receiving requests for the physical location information of one of the program components from one of the client terminals;

the component registration program causing the application server to:

deploy the program component in the container server;

create, in the scheduler unit, a deployed queue for storing a request to process the program component corresponding to the deployed program component;

register correspondence between physical position information of the deployed program component and physical position information of the deployed queue in a queue management table;

register the physical position information of the deployed queue with a logical name of the deployed program component;

when receiving a request for the location information of the deployed program component by the naming service unit, the naming service unit obtaining the physical position information of the deployed queue using the logical name of the deployed program component and sending the obtained physical position information of the deployed queue to one of the client terminals in response to the received request; and the scheduler unit storing one of the processing requests received from said one of the client terminals into the deployed queue.

5. A non-transitory computer-readable medium which stores a component registration program for registering a program component in an application server, the application server comprising:

a container server unit, including a plurality of program components, for executing the program components;

a scheduler unit including queues for storing processing requests from client terminals, wherein the processing requests are to be executed by one of the program components; and a naming service unit for receiving requests for physical location information of one of the program components from one of the client terminals;

the component registration program causing the application server to:

extract, from the naming service unit, the logical names and physical position information of the program components registered in the naming service unit;

select a newly registered program component based on the extracted logical names of the program components;

create a new queue for storing a request to process the newly registered program component;

register correspondence between physical position information of the newly registered program component and physical position information of the created new queue in a queue management table;

register the physical position information of the created new queue with a logical name of the newly registered program component;

when receiving a request for the physical location information of the newly registered program component by the naming service unit, the naming service unit obtaining the physical position information of the created new queue using the logical name of the newly registered program component and sending the obtained physical position information of the created new queue to one of the client terminals in response to the received request; and the scheduler unit storing one of the processing requests received from said one of the client terminals into the created new queue.

6. A non-transitory computer-readable medium which stores a component registration program for controlling execution of a program component in an application server, the application server comprising:

a container server unit, including a plurality of program components, for executing the program components;

a scheduler unit including queues for storing processing requests from client terminals, wherein the processing requests are to be executed by one of the program components; and a naming service unit for receiving requests for physical location information of one of the program components from one of the client terminals;

the component registration program causing the application server to:

when deploying one of the program components by the container server unit, the scheduler unit creating a new queue in the scheduler unit for the deployed program component and registering physical position information of the created new queue and a logical name of the deployed program component to correspond to each other in a queue management table;

output, to one of the client terminals, the physical position information of one of the queues corresponding to the logical name of the program component indicated by one of the client terminals;

store one of the processing requests for the program component indicated by said one of the client terminals in said one of the queues;

cause the scheduler unit to extract said one of the processing requests for the program component stored in one of the queues, refer to the queue management table to obtain physical position information of the program component, and request executing on one of the program components indicated by the physical position information of the program component to the container server unit;

cause the container server unit to execute the program component on which said one of the processing requests has been received; and send data resulting from the execution of the program component to said one of the client terminals through the scheduler unit.

7. An application server, comprising:

a container server unit, including a plurality of program components in a memory of the application server, for executing the program components on a CPU;

a scheduler unit including queues for storing processing requests from client terminals in the memory of the application server, wherein the processing requests are to be processed by one of the program components; and a naming service unit for receiving a requests for physical location information of one of the program components from one of the client terminals, wherein, when deploying a program component by the container server unit, the application server creates a new queue for storing a processing request for the program component in the scheduler unit and further registers physical position information of the new queue with a logical name of the deployed program component to correspond to each other in a queue management table, wherein, when receiving a request for the location information of the deployed program component by the name service unit, the naming service unit obtains the physical position information of the new queue using the logical name of the program component and sends the obtained physical position information of the new queue to the client terminal, and wherein the scheduler unit extracts the processing request for the program component from the new queue to execute the program component by the container server unit.

8. The application server according to claim 7, wherein the application server is connected to another application server, wherein the naming service unit further registers physical position information of program components deployed in a container server of the other application server with logical names of the program components, and wherein further, when the scheduler unit has received a processing request on one of the program components registered in the container server unit of the other application server, the scheduler unit sends the processing request to a scheduler unit of the other application server.

9. An application server, comprising:

1) a container server unit, including a plurality of program components in a memory of the application server, wherein the container server unit is used for:
   executing the program components on a CPU, and
   deploying one of the program components;

2) a scheduler unit, including queues, for:
   storing processing requests from client terminals in the memory of the application server, wherein the processing requests are to be executed by one of the program components on the CPU,
   creating a new queue for the deployed program component;
   registering a physical position information of the created new queue and a logical name of the deployed program component to correspond to each other in a queue management table,
   when the scheduling unit receives a processing request, storing the processing request into the created new queue according to the location information indicated by the processing request; and 3) a naming service unit for:
   when receiving a request for physical location information of one of the program components from one of the client terminals,
   obtaining the physical position information of the created new queue using the logical name of the deployed program component, and
   sending the obtained physical position information of the created new queue to the client terminal in response to the received request.

* * * * *